(12) United States Patent
Snyder et al.

(10) Patent No.: US 6,770,209 B2
(45) Date of Patent: Aug. 3, 2004

(54) ISOTROPIC DEPOSITION FOR TRENCH NARROWING OF FEATURES TO BE CREATED BY REACTIVE ION ETCH PROCESSING

(75) Inventors: Clinton David Snyder, Los Gatos, CA (US); Howard Gordon Zolla, San Jose, CA (US); Hong Xu, San Jose, CA (US); James Bernard Kruger, Half Moon Bay, CA (US)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 10/043,373

(22) Filed: Jan. 9, 2002

(65) Prior Publication Data

US 2003/0128463 A1 Jul. 10, 2003

(51) Int. Cl.[7] .................... B44C 1/22; G11B 5/127; H04R 31/00
(52) U.S. Cl. ...................... 216/22; 29/603.07
(58) Field of Search ............ 216/22; 29/603.01, 29/603.07, 603.15, 603.16, 603.18; 438/3; 360/119, 120

(56) References Cited

U.S. PATENT DOCUMENTS

| | | | |
|---|---|---|---|
| 4,417,393 A | 11/1983 | Becker | 29/846 |
| 4,803,338 A | 2/1989 | Kumasaka et al. | 360/122 |
| 4,871,630 A | 10/1989 | Giammarco et al. | 430/14 |
| 5,595,941 A | 1/1997 | Okamoto et al. | 437/228 |
| 5,658,826 A | 8/1997 | Chung | 438/570 |
| 5,710,066 A | 1/1998 | Okamoto et al. | 437/228 |
| 5,719,089 A | 2/1998 | Cherng et al. | 438/637 |
| 5,802,700 A | 9/1998 | Chen et al. | 29/603.14 |
| 5,863,707 A | 1/1999 | Lin | 430/313 |
| 5,867,890 A * | 2/1999 | Hsiao et al. | 29/603.14 |
| 5,907,775 A | 5/1999 | Tseng | 438/261 |
| 5,910,871 A | 6/1999 | Kawanami et al. | 360/122 |
| 6,100,014 A | 8/2000 | Lin et al. | 430/314 |
| 6,136,696 A | 10/2000 | Horiba | 438/639 |
| 6,140,201 A | 10/2000 | Jenq et al. | 438/396 |
| 2003/0128460 A1 * | 7/2003 | Zolla | 360/97.01 |

OTHER PUBLICATIONS

IBM Technical Disclosure Bulletin; D.R. Martin and M.J. McDermott; vol. 40 No. 03 Mar. 1997; pp. 247–250.
IBM Research Disclosure; Dec. 1999; "Shortcut Error Recovery Procedure".

* cited by examiner

Primary Examiner—Gregory Mills
Assistant Examiner—Roberts P. Culbert
(74) Attorney, Agent, or Firm—Walter W. Duft

(57) ABSTRACT

An isotropic deposition method for trench narrowing of thin film magnetic write head features to be created by reactive ion etching. According to the method, a photolithographically defined photoresist trench is formed over a hardmask and underlying polymer layer as part of tri-layer resist process. Instead of performing the usual hardmask and polymer etching steps using the photoresist mask pattern, a spacer layer is deposited isotropically or directionally at an angle to cover the vertical side walls of the trench. The spacer layer is etchable by the hardmask etch process but resistant to the polymer etch process. When the hardmask etch process is performed, the spacer layer material applied to the trench side walls remains intact, thereby defining a narrowed trench that is extended by the subsequent base layer etch process.

10 Claims, 4 Drawing Sheets

ISOTROPIC DEPOSITION FOR TRENCH NARROWING OF FEATURES TO BE CREATED BY REACTIVE ION ETCH PROCESSING

BACKGROUND OF THE INVENTION

1. Field of the Invention

The present invention relates to thin film heads for magnetically writing information on data storage media, and particularly to fabrication processes for manufacturing such heads. Still more particularly, the invention concerns the reduction of write head feature size beyond that which can be achieved using conventional photolithography.

2. Description of the Prior Art

By way of background, thin film magnetic write heads for use in data storage devices, such as disk drives, conventionally include features such as P1 and P2 pole pieces that cooperate to record magnetic domains in concentric track patterns on an underlying data storage medium. The configuration of the pole pieces, and particularly the track width feature size, is an important determinant of the track width of the magnetic domains recorded on the underlying medium. Because narrow track width translates to increased data storage capacity, all other things being equal, it is a design goal of disk drive manufacturers to reduce the track width feature size of the pole pieces.

In thin film magnetic head processing, features are constructed using photolithographic processes. For example, to fabricate a pole piece, a photoresist layer is formed, then photo-exposed using a photolithographic mask to define the pole piece geometry, and then photo-developed to form a trench conforming to the defined geometry. The metallic pole piece material (typically a nickel-iron alloy) is deposited in the trench using an electroplating process. The remaining photoresist material is then stripped away, leaving behind the fully formed pole piece. In a tri-layer resist process, a feature is formed in a polymer layer using a "hardmask" layer over the polymer material. A standard photoresist layer is spun onto the hardmask and patterned to define the desired etch mask. Two etching processes are used to first etch the hardmask and then the polymer layer. The function of the hard mask is to ensure that the feature is formed anisotropically in the polymer layer during the second etching phase.

The problem with this type of processing is that feature size can only be narrowed photolithographically by using shorter wavelength light and contrast enhancement techniques. Thus, whether conventional photolithography is used, or newer technologies such as deep UV or electron beam lithography, reductions in feature size typically require new and more expensive light sources and exposure technology. An additional disadvantage of photolithographic solutions is that line edge roughness becomes a concern as photolithographic features become ever smaller.

Accordingly, an improved technique for reducing feature size in a thin film magnetic write head is required if improvements in disk drive performance are to be achieved. What is particularly needed is a new technique whereby feature size can be reduced while using any thin film magnetic head photolithographic process, including deep UV or electron beam lithography, without having to invest in higher cost photolithographic resolution enhancement solutions. An additional desirable requirement is that the technique be compatible with a tri-layer resist process in which a hardmask and an underlying polymer layer are separately etched to define features. A further requirement is that of reducing the line edge roughness of the photolithographically defined trenches.

SUMMARY OF THE INVENTION

The foregoing problems are solved and an advance in the art is obtained by a novel isotropic deposition method for trench narrowing of thin film magnetic write head features to be created by reactive ion etching. According to the method, a polymer base layer is formed on a substrate, such as an electroplating seed layer. A hardmask layer (hardmask) is applied onto the polymer layer and a photoresist imaging layer is spun onto the hardmask to a desired thickness. A trench is defined in the photoresist layer to form a pattern for the feature. The trench is deep enough to expose the hardmask, and has substantially vertical side walls. Following formation of the trench, a spacer layer is deposited isotropically or directionally at an angle to cover the trench side walls. The material used to form the spacer layer is one that can be deposited isotropically while preserving trench geometry, or directionally at an angle. The material must also be etchable by a subsequent hardmask etch process and resistant to a subsequent base layer etch process.

Horizontal portions of the spacer layer that overlie the bottom of the trench (if any) are anisotropically etched as part of the hardmask etch process to remove such material. Hardmask material is also removed from the trench bottom to expose the polymer layer. Vertical portions of the spacer layer that cover the trench side walls are left intact. This process initiates the formation of a narrowed trench that is reduced in horizontal size according to approximately twice the thickness of the spacer layer as deposited on the trench side walls.

The base layer etch process extends the trench anisotropically through the polymer layer to reveal the underlying substrate. This is done without removing the spacer layer material from the trench sidewalls, so that the narrowed trench size is carried through the polymer to the substrate. A feature, such as a metallic pole piece, may now be formed by electroplating metallic material into the narrowed trench.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
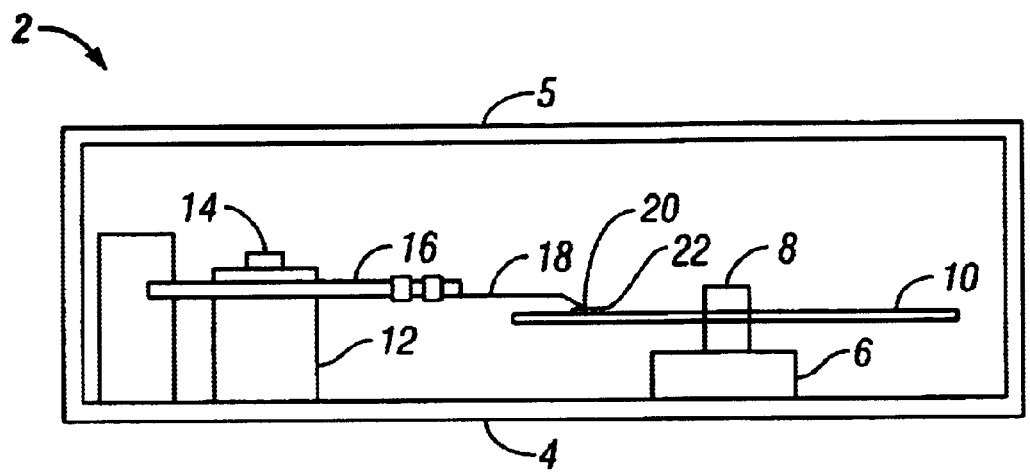
FIG. 1 is a simplified vertical sectional view of a magnetic disk drive that incorporates a magnetic write head made according the present invention.

Turning now to the figures, wherein like reference numerals represent like elements in all of the several views, FIGS.

1 and 2 illustrate a disk drive 2 that includes a magnetic write head constructed using the method of the invention. The disk drive 2 conventionally includes a base casting 4 made from aluminum or other suitable material. A cover 5 is removably mounted thereto via a hermetic seal (not shown). The base casting 4 supports a conventional spindle drive motor 6 having an associated drive spindle 8. The drive spindle 8 carries a disk 10 for high speed rotation therewith. Other disks (not shown) may also be carried on the drive spindle 8 to form a spaced vertically stacked disk platter arrangement. The disk 10 is made from a suitable material of a type usually found in magnetic disk drive assemblies. In particular, the disk 10 is formed from an aluminum or glass substrate with appropriate coatings being applied thereto such that at least one, and preferably both, of the upper and lower surfaces of the disk are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes a rigid actuator arm 16 that carries a flexible suspension 18. The suspension 18 in turn carries a slider 20 that mounts a transducer 22. The transducer 22 is an integrated device that includes a magnetic write head and a read head that may incorporate a conventional magnetoresistive sensor or the like. The actuator 12, which is conventionally driven by a voice coil motor 24, moves the slider 20 generally radially across the surface of the disk 10 so that the transducer 22 is able to trace concentric data tracks on the disk.

Data is recorded on the disk 10 by the write head portion of the transducer 22. Data is read from the disk 10 by the read head portion of the transducer 22. This data is processed into a readback signal by signal amplification and processing circuitry (not shown) that is conventionally located on the actuator arm 16. The readback signal, which carries both data and transducer position control information, is sent to the drive controller 25 for conventional processing. The controller 25 also generates write data and position control information during data write operations.

It will be appreciated that the foregoing detailed description of the disk drive 2 and the transducer 22 is exemplary in nature, and that many other design configurations would be possible while still incorporating a write head that has been fabricated according to the invention. For example, the disk drive 2 may include a large number of disks and actuators, and each actuator may carry plural suspensions and multiple sliders. Moreover, instead of using an air bearing slider, an alternative transducer carrying structure may be used that maintains the transducer 22 in contact or near contact with the disk 10.

Figure 3:
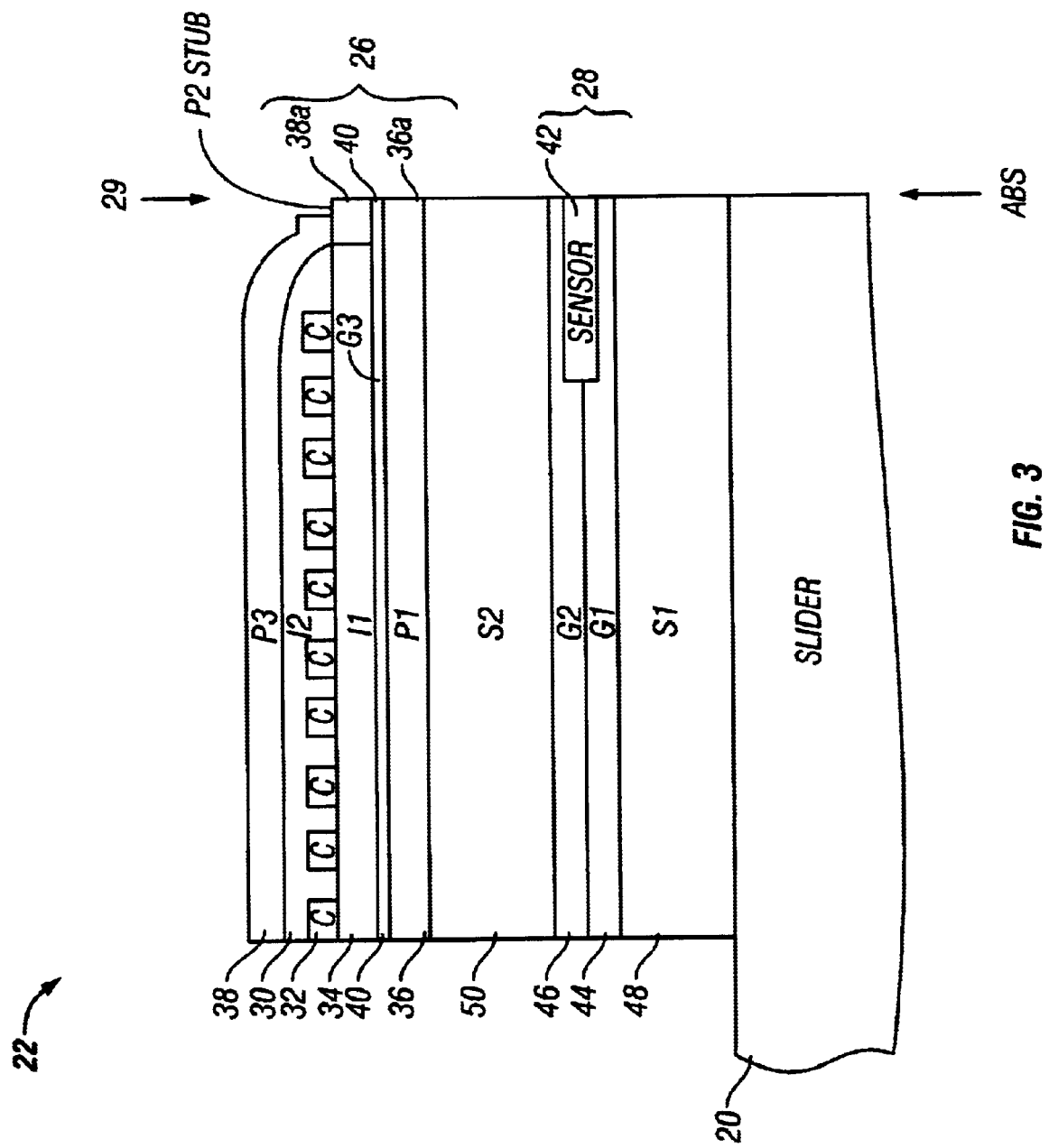
FIG. 3 is a sectional view taken through the track width centerline of an integrated magnetic read/write head made in accordance with the invention.
Figure 4:
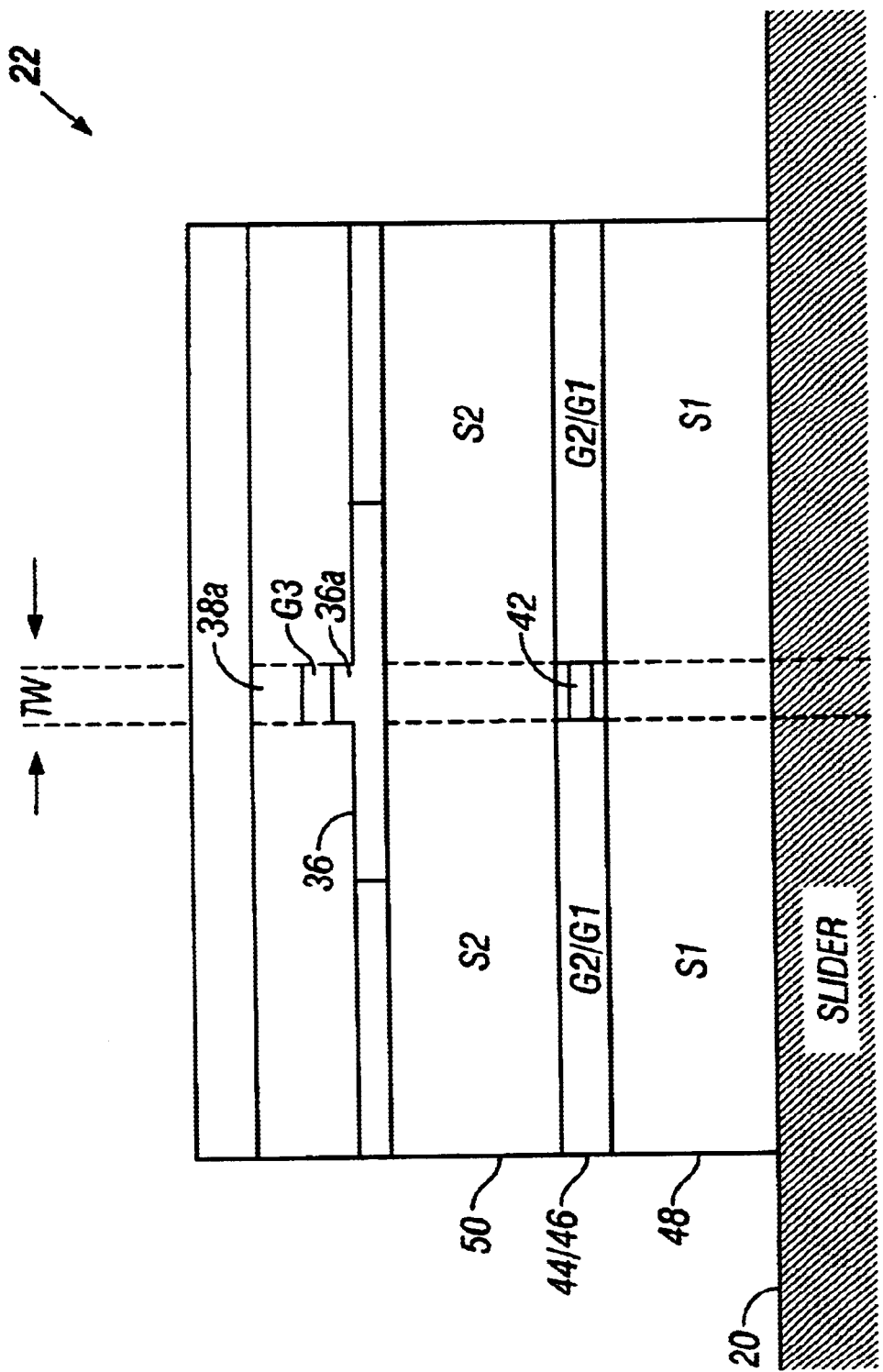
FIG. 4 is a front elevational view (taken from the air bearing surface) of the integrated read/write head of FIG. 3.

Turning now to FIGS. 3 and 4, the write head portion of the transducer 22 is shown at 26 and the read head portion of the transducer is shown at 28. The transducer 22 is shown in FIG. 3 as being lapped at 29 to form an air bearing surface (ABS). This ABS 29 is spaced from the rotating disk 10 during drive operation by virtue of the above-described air bearing. FIG. 4 shows the transducer 22 from the vantage point of the ABS 29.

The write head 26 conventionally includes a combined layer comprising 12 insulative material 30 and plural inductive coil loops 32. The combined insulation and coil layer 30/32 is formed on an I1 insulation layer 34. The coils of the combined layer 30/32 inductively drive first and second pole pieces 36 and 38. A G3 gap layer 40 is sandwiched between the pole pieces 36 and 38 to provide a magnetic write gap at the pole tips 36a and 38a located adjacent to the ABS 29. Note that the pole piece 36 is commonly referred to as a "P1" pole piece and is labeled as such in FIG. 3. The pole piece 38 may either be referred to as a "P2" or "P3" pole piece depending on how the pole tip 38a is formed. If, as shown in FIG. 3, the pole tip 38a is formed separately from the pole piece 38, the pole piece 38 is referred to as a "P3" pole piece (and is labeled as such in FIG. 3) and the pole tip 38a is referred to as a "P2 stub" (as also shown in FIG. 3). If the pole tip 38a is formed with as part of the pole piece 38, the pole piece 38 is referred to as a "P2" pole piece. During a data write operation, signal current is conducted through the coils C of the combined layer 30/32, and flux is induced into the pole pieces 36 and 38. This flux fringes across the pole tips 36a and 38a at the ABS 29 and forms magnetic domains on the rotating disk 10. As indicated above, the magnetic domains are arranged to define concentric tracks on the disk 10. Note that the back gap portion of the write head 26 is not shown in FIG. 3.

FIG. 4 shows the face of the pole tip portions 36a and 38a of the pole pieces 36 and 38. The track width feature size of the pole tips 36a and 38a is defined by the dimension TW in FIG. 4. It will be seen that the pole piece 36 also includes a lower portion that extends beyond the track width dimension TW. This configuration is shown by way of example only and will not necessarily be found in other write heads made in accordance with the invention.

The read head 28 of FIGS. 3 and 4 includes a thin film read sensor 42 disposed in adjacent G1 and G2 gap areas 44 and 46. The G1 and G2 gap areas 44 and 46 are in turn sandwiched between a first (S1) magnetic shield layer 48 and second (S2) magnetic shield layer 50 that in some designs may also be used to provide the pole piece 36. The S1 shield layer 48 is conventionally formed over the slider 20, which is only partially shown in FIGS. 3 and 4 for clarity. During a read operation, magnetized domains on the concentric tracks of the rotating disk 10 inject flux into the read sensor 42. This influences the read sensor 42, causing a corresponding signal to be produced by the read sensor's sensing circuit (not shown).

Turning now to FIGS. 5A–5E, a method is shown for producing features of the write head 26, such as the pole piece 38, so that its pole tip 38a has reduced track width feature size at the ABS 29. Each of FIGS. 5A–5E is a sectional view taken along what will become the ABS 29 of the transducer 22, such that the pole piece track width feature size can be illustrated.

Figure 5A:
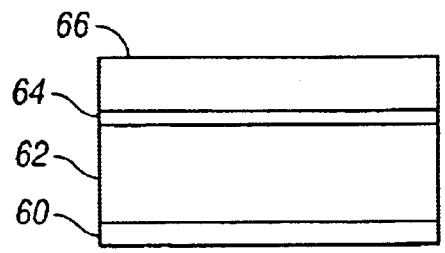
FIGS. 5A–5E are a sequence of diagrammatic sectional views showing the formation of a write head with reduced feature size according to the invention.

In FIG. 5A, a plating seed layer 60 comprising a nickel-iron (NiFe) alloy, a nickel-iron-cobalt (NiFeCo) alloy, an iron-aluminum alloy (FeAl) or any other suitable seed layer metal, is applied over an underlying structure (not shown) to a thickness of about 0.1 $\mu$m. After formation of the seed layer 60, which serves as a substrate for the subsequent layers, a base layer 62 is applied over the seed layer to a thickness of about 3–5 $\mu$m. The base layer 62 can be made from any suitable polymer, including Novalac resin, available under the product designation RMPN-60 from Sumitomo Chemical Co., Inc. A hardmask layer 64, made from tantalum oxide or the like, is applied over the base layer 62 to a thickness of about 0.1 $\mu$m. A photoresist imaging layer 66 comprising a conventional photoactive polymer material is spun onto the hardmask 64 to a thickness of about 0.5 $\mu$m.

Figure 5B:
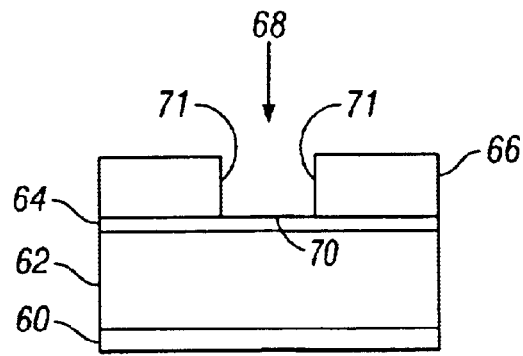

In FIG. 5B, a trench 68 is defined in the photoresist layer 66 to initiate the formation of a stencil for the feature of interest. The trench 68 is defined using the usual photoresist masking techniques, with the photoresist material being either a negative resist, or more conventionally, a positive resist. Using a wet etching process to remove the exposed photoresist material, the trench 68 will extend to the hardmask 64, and will be defined by a trench bottom 70 and substantially vertical side walls 71 that extend from the trench bottom to the top of the photoresist layer 66.

Figure 2:
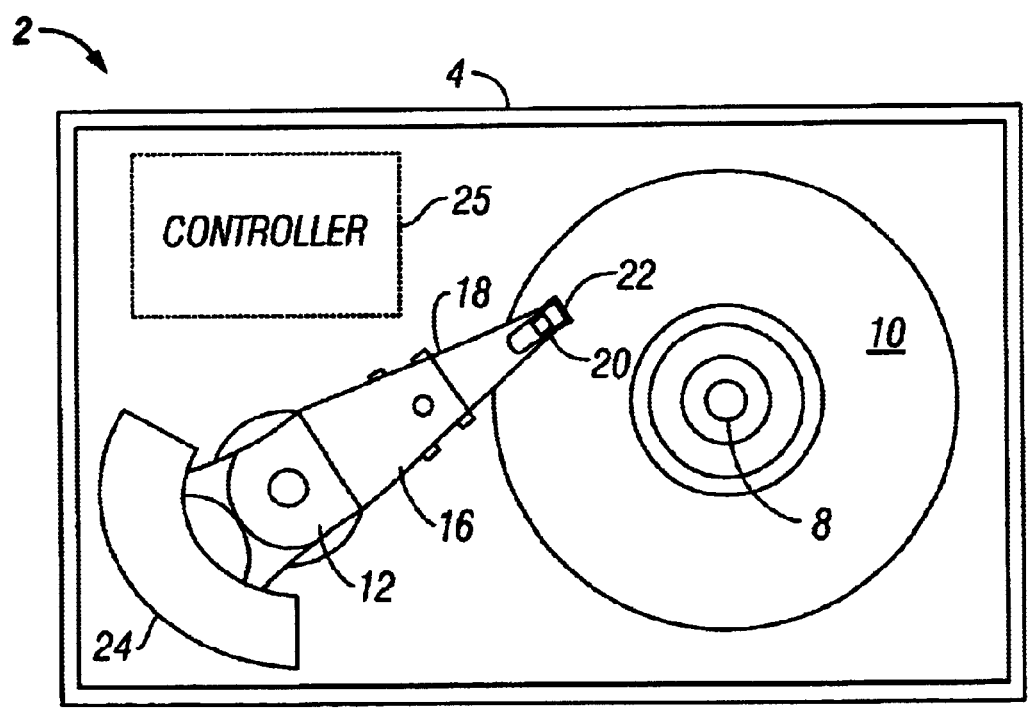
FIG. 2 is a simplified horizontal sectional view of the disk drive of FIG. 1.
Figures 1, 5C:
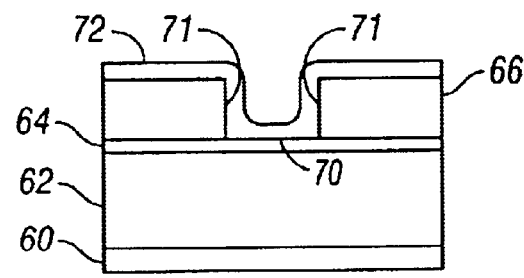
Figures 2, 5C:
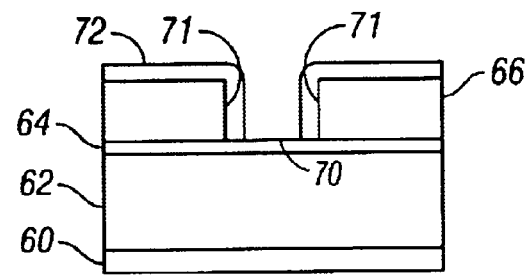

As shown in FIGS. 5C-1 and 5C-2, following formation of the resist-imaged trench 68 of FIG. 5B, a spacer layer 72 is deposited to cover at least the trench side walls 71. Preferred deposition techniques include isotropic deposition using a process such as PVD (Physical Vapor Deposition), CVD (Chemical Vapor Deposition) including PECVD (Plasma Enhanced CVD), or IBD (Ion Beam Deposition). FIG. 5C-1 illustrates an isotropically deposited spacer layer 72 that covers not only the trench vertical side walls 71, but also the trench bottom 70.

Note that the deposition process should preferably be one that can be implemented at relatively low temperature, e.g., less than about 100° Celsius, so that there is no softening of the photoresist layer 66. This requirement may be relaxed if a photoresist material is used which is compatible with higher temperatures. However, the temperature must not be so high as to cause degradation of the material layers of the read sensor 42.

As an alternative to isotropic deposition, the spacer layer 72 can be applied directionally at an angle using angled IBD or ion-assisted IBD (both of which are low temperature processes). According to this technique, and as illustrated in FIG. 5C-2, the spacer layer material is applied at an angle of between 0–90° (relative to the vertical axis of the trench 68) to coat the trench side walls 71 while minimizing or eliminating the deposition of spacer layer material at the trench bottom 70. This can help compensate for lag during subsequent RIE (Reactive Ion Etching) of the hardmask layer 64 and the polymer layer 62. The technique can be practiced both with substrate rotation and with a fixed rotation angle perpendicular to the trench 68.

The material used to form the spacer layer 72 must be carefully selected according to several criteria. In particular, the spacer layer material must be (1) capable of being deposited isotropically while faithfully preserving the shape of the trench 68, or directionally at an angle, (2) etchable in a subsequent hardmask etch, and (3) resistant to a subsequent base layer etch. The latter requirement ensures that the spacer layer material will help preserve the hardmask etch dimension during polymer etching. Materials that can satisfy all of the foregoing requirements are elements, compounds or alloys that can be easily deposited using one of the deposition processes described above and which can also be easily removed in an anisotropic manner by reactive ion etch methods using halogen or halogen compound etchants and implemented at relatively low temperatures (i.e., less than 100° Celsius) in order to avoid deformation of the trench-defining resist features.

Candidate elements having the potential to satisfy all of the foregoing requirements are metals and semiconductors, including carbon, in Groups 1b, 2b, 3a/b, 4a/b, 5a/b, 6b, 7b and 8 of the Periodic Table of Elements. Oxides, nitrides and carbides of such materials, as well as other compounds and alloys containing such materials, may also be used, as can combinations of any of the foregoing. If multiple spacer layer materials are used, they may be applied in multiple spacer sub-layers until the full spacer layer 72 is formed.

By way of example only and not by way of limitation, exemplary elemental materials that may be used to form the spacer layer 72 include silicon, germanium, tungsten, tantalum and titanium. Exemplary compounds include oxides, nitrides and carbides of silicon, germanium, tungsten, tantalum and titanium. Exemplary alloys include SiGe, GaAs, and others.

As indicated, the formation of the spacer layer 72 can be performed in multiple stages using different materials. In one particularly advantageous construction, the spacer layer 72 may be formed by first applying a coating of tantalum or titanium (or other suitable material) and then applying a coating of tungsten. Tungsten is advantageous because it facilitates focused ion beam imaging of a small area of a production thin film wafer for periodic process control monitoring or other testing. It is also more readily etchable by the hardmask etch process now to be discussed. A disadvantage of tungsten is that it must be applied at relatively high temperature, which, if not for the undercoating of tantalum or titanium (or other material), could cause undesirable widening/flaring of the trench 68 by melting the photoresist material.

Figure 5D:
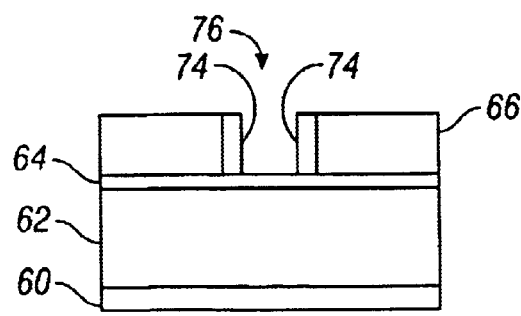

In FIG. 5D, horizontal portions of the spacer layer 70 are etched (anisotropically) during the hardmask etch process. This removes spacer layer material, if it is present, from the bottom 70 of the trench 68. This etching step also removes the hardmask material at the trench bottom 70 to expose the base layer 62. The spacer layer vertical portions 74 that cover the trench side walls 71 are left intact during this process. The hardmask etch step is conventionally performed using reactive ion etching, with a halogen or halogen compound etchant being typically used. This process initiates the formation of a narrowed trench 76 that is narrowed according to approximately twice the thickness of the spacer layer vertical portions 74.

The thickness of the spacer layer vertical portions 74 may be controlled to range from zero up to about 200 nm. At that point, the time required to deposit additional spacer layer material may act as a disincentive against further increases in spacer layer thickness. The thickness at which the spacer layer 70 is applied will also depend on the starting width of the trench 68, with less spacer layer material being required for trenches of small size.

Note that if the spacer layer 72 is deposited according to the two-step deposition process described above, a base layer of tantalum or titanium (or other material) could be applied at a thickness of about 50 nm, and the second layer of tungsten (if used) could be applied at a thickness of about 0–150 nm.

Figure 5E:
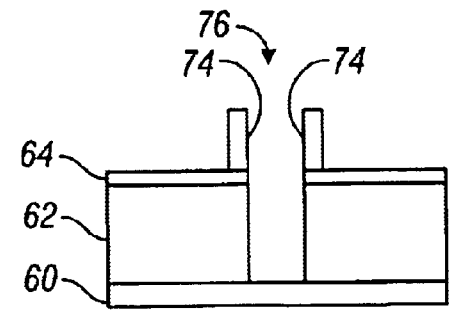

In FIG. 5E, the base layer etch is conventionally performed using reactive ion etching, with an oxidizing etchant being typically used. This process defines the narrowed trench 76, which as stated above is narrowed according to approximately twice the thickness of the spacer layer vertical portions 74. Moreover, because the spacer layer deposition process produces a relatively smooth surface on the spacer layer vertical portions 74, the narrowed trench 76 can be contoured more precisely than a trench formed purely lithographically.

The base layer etch process also removes the photoresist layer 66 while typically leaving behind all or part of the spacer layer vertical portions 74. A feature, such as a metallic pole piece, may now be formed by electroplating metallic material into the narrowed trench. The hardmask 64, the spacer layer vertical portions 74 and the polymer layer 62 may then be removed, preferably by a combination of dry and wet etch processes.

Accordingly, an isotropic deposition method for trench narrowing of magnetic write head features to be created by reactive ion etching has been disclosed. While various embodiments of the invention have been described, it should be apparent that many variations and alternative embodiments could be implemented in accordance with the invention. For example, although fabrication of the pole tip 38a is shown in FIGS. 5A–5E, the disclosed method could also be used to fabricate the pole tip 36a, as well as the coils 32 of the combined layer 30/32 (to reduce coil pitch). It is understood, therefore, that the invention is not to be in any way limited except in accordance with the spirit of the appended claims and their equivalents.

What is claimed is:

1. An isotropic deposition method for trench narrowing of thin film magnetic write head features to be created by reactive ion etching, comprising the steps of:

forming a polymeric base layer over a substrate;

applying a hardmask layer over said base layer;

applying an imaging photoresist layer over said hardmask layer;

defining a trench in said photoresist layer that exposes said hardmask layer, said trench having substantially vertical side walls and a bottom defined by said hardmask layer;

depositing a spacer layer isotropically or directionally at an angle using a deposition process to cover said trench side walls;

performing a first anisotropic etching process to remove horizontal portions of said spacer layer and said hardmask from said trench bottom while leaving intact vertical portions of said spacer layer that cover said trench side walls, thereby initiating formation of a first portion of a narrowed trench; and performing a second anisotropic etching process to extend said-narrowed trench through said base layer to said substrate;

whereby a magnetic write head feature of reduced feature size may be formed in said narrowed trench.

2. A method in accordance with claim 1 wherein said spacer layer is applied using an isotropic low temperature vapor deposition or ion beam deposition technique and said spacer layer comprises a material that can be deposited isotropically over said photoresist layer while preserving the geometry of said trench.

3. A method in accordance with claim 1 wherein said spacer layer is applied at an angle using a directional ion beam deposition technique, with or without substrate rotation, and said spacer layer comprises a material that can be deposited directionally at an angle over said photoresist layer.

4. A method in accordance with claim 1 wherein said first etching process uses a halogen or halogen compound etchant, said second etching process uses an oxidizing etchant, and said spacer layer comprises a material that is etchable by said first etching process and resistant to said second etching process.

5. A method in accordance with claim 1 wherein said spacer layer comprises a metal or a semiconductor, including carbon, or an oxide, a nitride, a carbide or other compound or alloy thereof.

6. A method in accordance with claim 1 wherein said spacer layer comprises a material or an oxide, a nitride, a carbide or other compound or alloy of a material selected from the group consisting of silicon, germanium, tungsten, tantalum and titanium.

7. A method in accordance with claim 6 wherein said spacer comprises a first deposition layer of a first one of said materials and a second deposition layer of a second one of said materials.

8. A method in accordance with claim 7 wherein said first deposition layer comprises a layer of tantalum or titanium that is deposited using an ion beam deposition process, and said second deposition layer comprises a layer of tungsten that is deposited using a chemical vapor deposition process.

9. A method in accordance with claim 1 wherein said spacer layer is deposited at a thickness of up to about 200 nm.

10. A method in accordance with claim 9 wherein said spacer layer comprises a first ion beam deposited layer of tantalum or titanium having a thickness of about 50 nm, and a second chemical vapor deposited layer of tungsten having a thickness of up to about 150 nm.

* * * * *